(12) United States Patent
Dinan et al.

(10) Patent No.: US 8,107,888 B2
(45) Date of Patent: Jan. 31, 2012

(54) COMMUNICATION OPERATING MODE SELECTION BASED ON MULTI-PATH SIGNAL POWER MEASUREMENT

(75) Inventors: Esmail Hejazi Dinan, Herndon, VA (US); Saied Kazeminejad, Ashburn, VA (US)

(73) Assignee: Clearwire IP Holdings, LLC, Bellevue, WA (US)

( * ) Notice: Subject to any disclaimer, the term of this patent is extended or adjusted under 35 U.S.C. 154(b) by 519 days.

(21) Appl. No.: 12/397,702

(22) Filed: Mar. 4, 2009

(65) Prior Publication Data

US 2010/0227567 A1  Sep. 9, 2010

(51) Int. Cl.
*H04B 7/00* (2006.01)
(52) U.S. Cl. .............. 455/69; 455/68; 455/450
(58) Field of Classification Search .......... 455/68, 455/69, 450, 452.1, 452.2, 562.1
See application file for complete search history.

(56) References Cited

U.S. PATENT DOCUMENTS

| | | | |
|---|---|---|---|
| 5,640,414 A | 6/1997 | Blakeney et al. | |
| 6,774,864 B2 * | 8/2004 | Evans et al. | 343/853 |
| 6,873,834 B1 * | 3/2005 | Edwards et al. | 455/277.1 |
| 2007/0064586 A1 | 3/2007 | Ma et al. | |
| 2007/0110100 A1 | 5/2007 | Wunder et al. | |
| 2007/0263569 A1 * | 11/2007 | Choi et al. | 370/334 |
| 2008/0108352 A1 | 5/2008 | Montemurro et al. | |

* cited by examiner

*Primary Examiner* — An Luu
(74) *Attorney, Agent, or Firm* — O'Brien Jones, PLLC

(57) ABSTRACT

A method for communication operating mode selection is presented. In the method, each of a plurality of communication signals is transmitted by way of a separate one of a first plurality of antennas according to a first operating mode. The transmitted communication signals are received by way of a second plurality of antennas. A multi-path power metric of the received communication signals is generated. Based on the multi-path power metric, each of the plurality of communication signals is transmitted by way of the first plurality of antennas according to a second operating mode instead of the first operating mode.

20 Claims, 6 Drawing Sheets

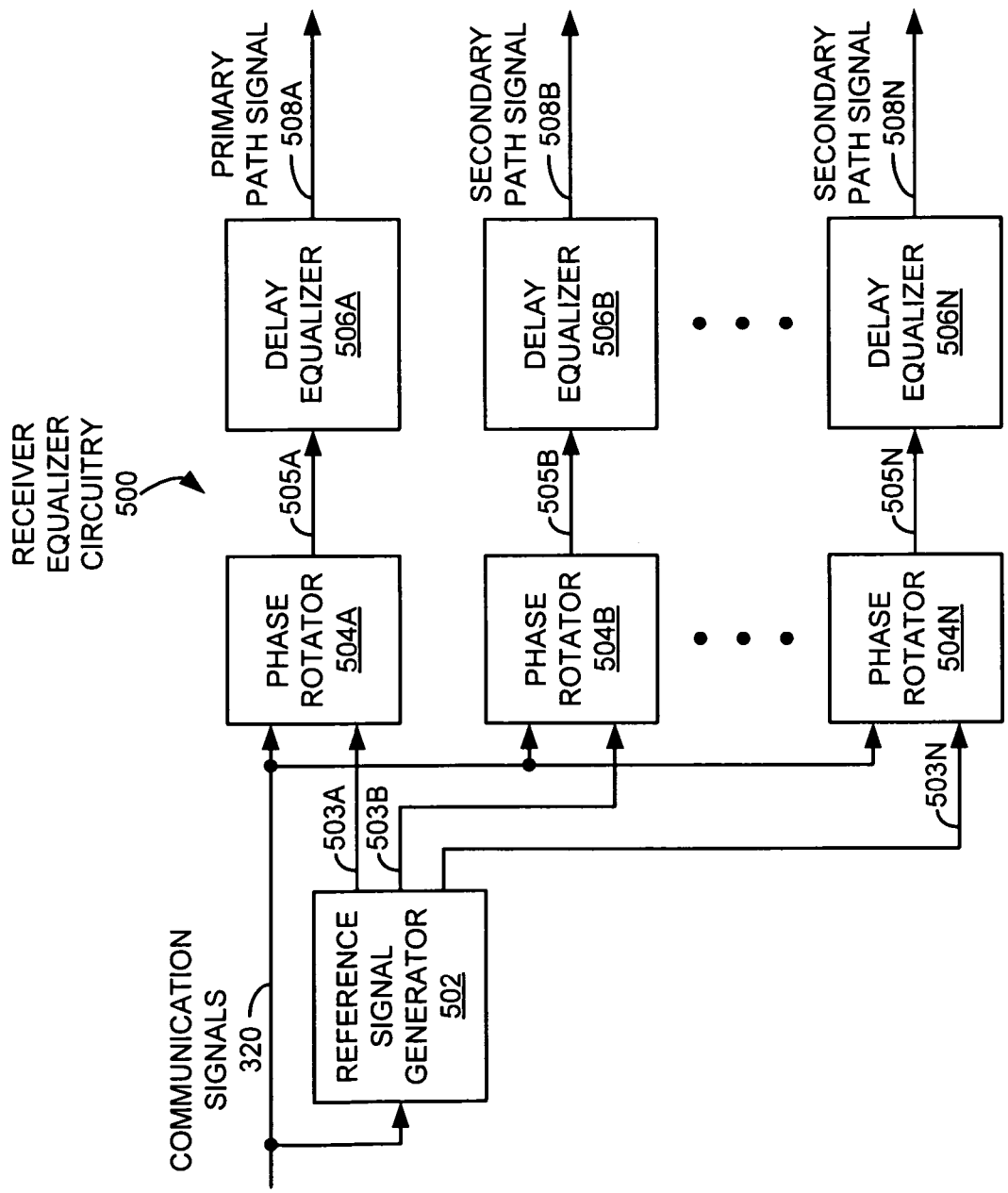

| MCS MODE | MIMO MODE | BITS/SYMBOL | DECISION METRIC |
|---|---|---|---|
| QPSK 1/8 | STC | 0.25 | THRESHOLD RANGE 1 |
| QPSK 1/4 | STC | 0.5 | THRESHOLD RANGE 2 |
| QPSK 1/2 | STC | 1 | THRESHOLD RANGE 3 |
| QPSK 3/4 | STC | 1.5 | THRESHOLD RANGE 4 |
| 16QAM 1/2 | STC | 2 | THRESHOLD RANGE 5 |
| 16QAM 3/4 | STC | 3 | THRESHOLD RANGE 6 |
| 64QAM 1/2 | STC | 3 | THRESHOLD RANGE 7 |
| 64QAM 2/3 | STC | 4 | THRESHOLD RANGE 8 |
| 64QAM 3/4 | STC | 4.5 | THRESHOLD RANGE 9 |
| 64QAM 5/6 | STC | 5 | THRESHOLD RANGE 10 |
| 64QAM 1/2 | SM | 6 | THRESHOLD RANGE 11 |
| 64QAM 2/3 | SM | 8 | THRESHOLD RANGE 12 |
| 64QAM 3/4 | SM | 9 | THRESHOLD RANGE 13 |
| 64QAM 5/6 | SM | 10 | THRESHOLD RANGE 14 |

FIG. 6

COMMUNICATION OPERATING MODE SELECTION BASED ON MULTI-PATH SIGNAL POWER MEASUREMENT

TECHNICAL BACKGROUND

Wireless communication systems, such as cellular telecommunication systems, wireless broadband communication systems, and the like, are capable of providing the user several advantages over wireline communication systems. At the least, wireless systems are capable of providing greatly enhanced user mobility while providing access to a large communication network over extensive geographic areas. Additionally, the wireless communication system may facilitate such user access without the usual costs related to cabling and other infrastructure typically associated with connecting each individual subscriber to the network.

With these advantages come some potential challenges, the primary concern often being the provision of acceptable communication signal quality. However, many different technological advances in improving signal quality have been developed. One such advance is the employment of multiple-input, multiple-output (MIMO) antenna systems. In a typical MIMO antenna configuration, a base station employs two antennas to exchange communication signals with a user communication device, such as a cell phone or personal digital assistant (PDA), while the user device also employs two antennas, albeit in a more compact configuration. Further, the antenna configuration may often be operated in at least two different modes that address varying environmental or geographic conditions. One particular area of focus in the operation of such an antenna system is the specific circumstances under which each particular mode should be employed, since selection of the "wrong" mode at any particular time may result in unnecessarily reduced communication throughput and customer dissatisfaction.

OVERVIEW

Discussed herein is a method for communication operating mode selection in a wireless communication network. In the method, each of a plurality of communication signals is transmitted by way of a separate one of a first plurality of antennas according to a first operating mode. A second plurality of antennas receives the transmitted communication signals. A multi-path power metric of the received communication signals is generated. Based on the multi-path power metric, each of the plurality of communication signals is transmitted by way of the first plurality of antennas according to a second operating mode instead of the first operating mode. A computer-readable medium comprising instructions executable by a processor for selecting the antenna mode according to this method is also disclosed.

Further presented herein is a communication station configured to employ antenna mode selection. The communication station includes a plurality of antennas and a plurality of transmitters, wherein each of the transmitters is configured to generate a communication signal for a corresponding one of the antennas, and to transmit the communication signal to a communication device by way of the corresponding one of the antennas. Also included in the communication station is control logic configured to operate the transmitters in a first operating mode when transmitting the communication signals. The control logic is also adapted to receive a multi-path power metric of the communication signals as received at the communication device, and, based on the multi-path power metric, to operate the transmitters in a second operating mode instead of the first operating mode.

In another embodiment, a communication device includes a plurality of antennas and a plurality of receivers, wherein each of the receivers is configured to receive a communication signal from a communication station by way of a corresponding one of the antennas. Also incorporated in the communication device is control logic adapted to receive the communication signal from the plurality of receivers and to generate a multi-path power metric based on the received communication signals. The control logic is also configured to transmit the multi-path power metric to the communication station for determining an operating mode of the receivers.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 5 is a block diagram of a portion of a receiver equalizer for the wireless communication system of FIG. 3 for determining power for each path of a received multi-path communication signal according to an embodiment of the invention.

FIG. 6 is a table relating various communication operating modes to a multi-path power metric according to an embodiment of the invention.

DETAILED DESCRIPTION

The following description and associated figures depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
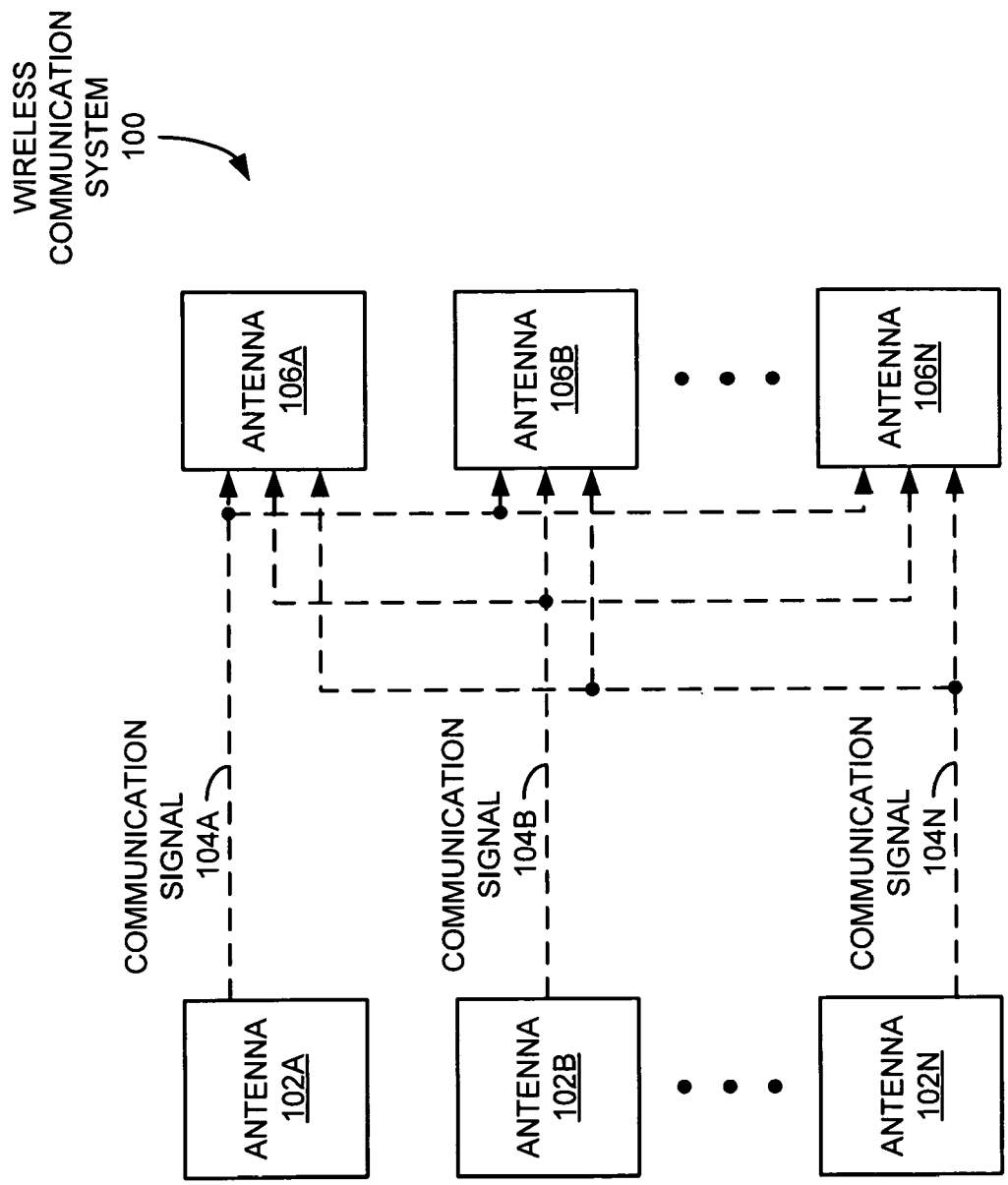
FIG. 1 is a block diagram of a portion of a wireless communication system employing multiple antennas according to an embodiment of the invention.

FIG. 1 provides a block diagram of a portion of a wireless communication system 100. The system 100 includes a first plurality of antennas 102A, 102B, . . . , 102N, each of which is configured to transmit a corresponding communication signal 104A, 104B, . . . , 104N. Also included in the system 100 is a second plurality of antennas 106A, 106B, . . . , 106N for receiving the communication signals 104. Each of the second antennas 106 receive each of the signals 104, with each of the second antennas 106 possibly receiving a different version of the signals 104 due to the different locations, or "space diversity", of each of the first antennas 102 and the second antennas 106. In many cases, the use of the multiple antennas 102, 106 and the space diversity they provide allow better recovery of marginal communication signals than many single-antenna systems.

Furthermore, the multiple antennas 102, 106 may be operated in more than one operating mode, determined primarily by the nature of the communication signals 104 being transmitted. For example, under favorable geographic and atmospheric conditions, the multiple antennas 102, 106 may operate under a mode which maximizes the data throughput of the system 100, such as having each communication signal 104 carry different data. Oppositely, in a less-desirable wireless communication environment, such as a protracted distance between the first antennas 102 and the second antennas 106, or poor atmospheric conditions, the multiple antennas 102, 106 may be operated under a different mode in which multiple versions of the same data may be carried by two or more of the communication signals 104, thus providing space and/or time diversity to the redundant data.

While FIG. 1 describes a multiple-antenna environment involving three or more antennas on both the transmission and reception ends of the system 100, any communication system involving two or more first antennas 102 and two or more second antennas 106 may be operated as described in greater detail below. Also, while the embodiment of FIG. 1 describes a system in which the number of first antennas 102 is equal to the number of second antennas 106, other implementations may not be limited in such a manner.

Figure 2:
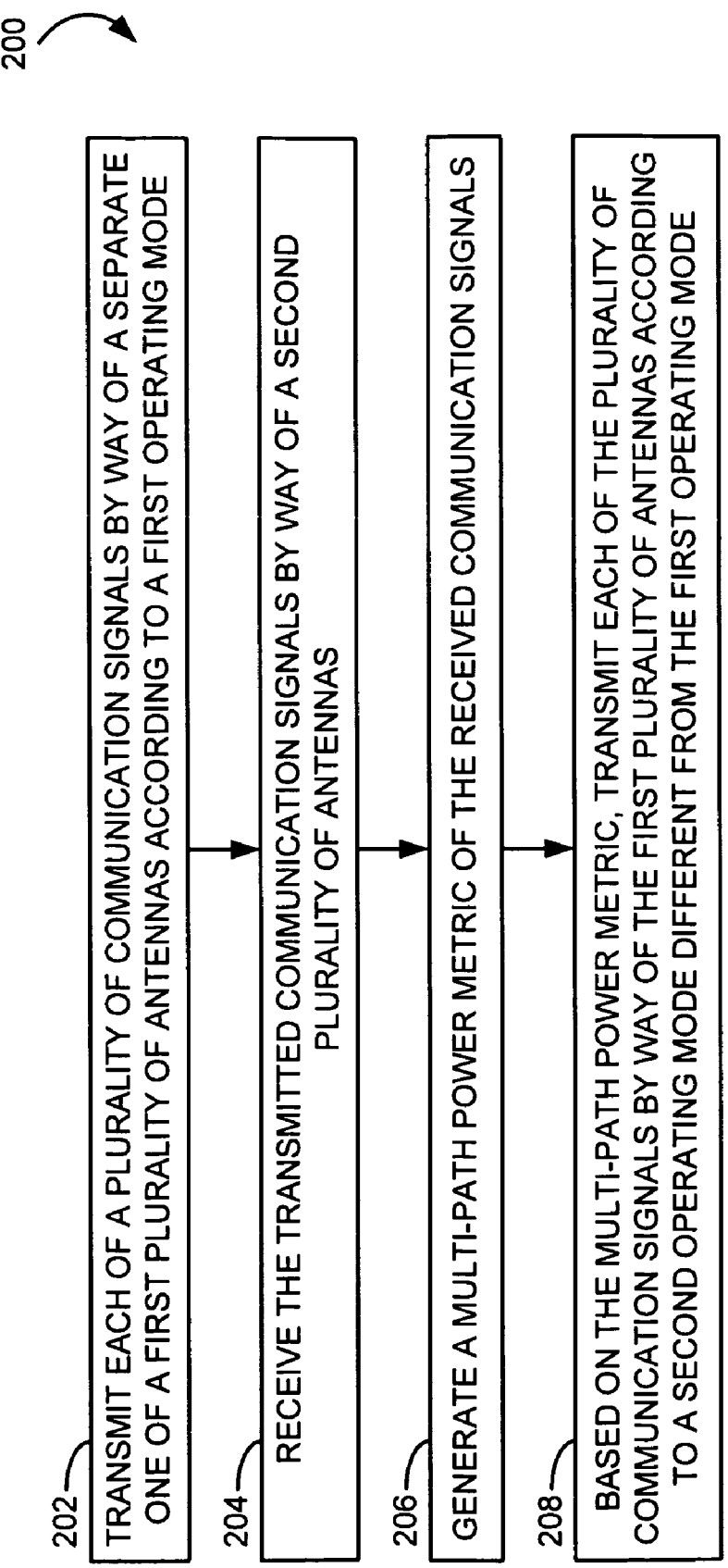
FIG. 2 is a flow diagram illustrating a method according to an embodiment of the invention for selecting a communication operating mode for the wireless communication system of FIG. 1.

FIG. 2 presents a flow diagram of a method 200 according to an embodiment of the invention for communication operating mode selection involving the wireless communication system 100, although other communication systems, both wireline and wireless, may benefit from aspects of the method 200. In the method 200, each of the plurality of communications signals 104 are transmitted by way of a separate one of the first plurality of antennas 102 according to a first operating mode (operation 202). The transmitted communication signals 104 are received by way of a second plurality of antennas 106 (operation 204). A multi-path power metric of the received communication signals 104 is generated (operation 206). Based on the multi-path power metric, each of the plurality of communication signals 104 are transmitted by way of the first plurality of antennas according to a second operating mode different from the first operating mode (operation 208). While the operations 202-208 of FIG. 2 are presented in a specific order, other possible orders of execution, including concurrent execution of two or more of the operations, are possible in other implementations. In another embodiment, a computer-readable medium may have encoded thereon instructions executable by one or more processors for employing the method 200 of FIG. 2.

Figure 3:
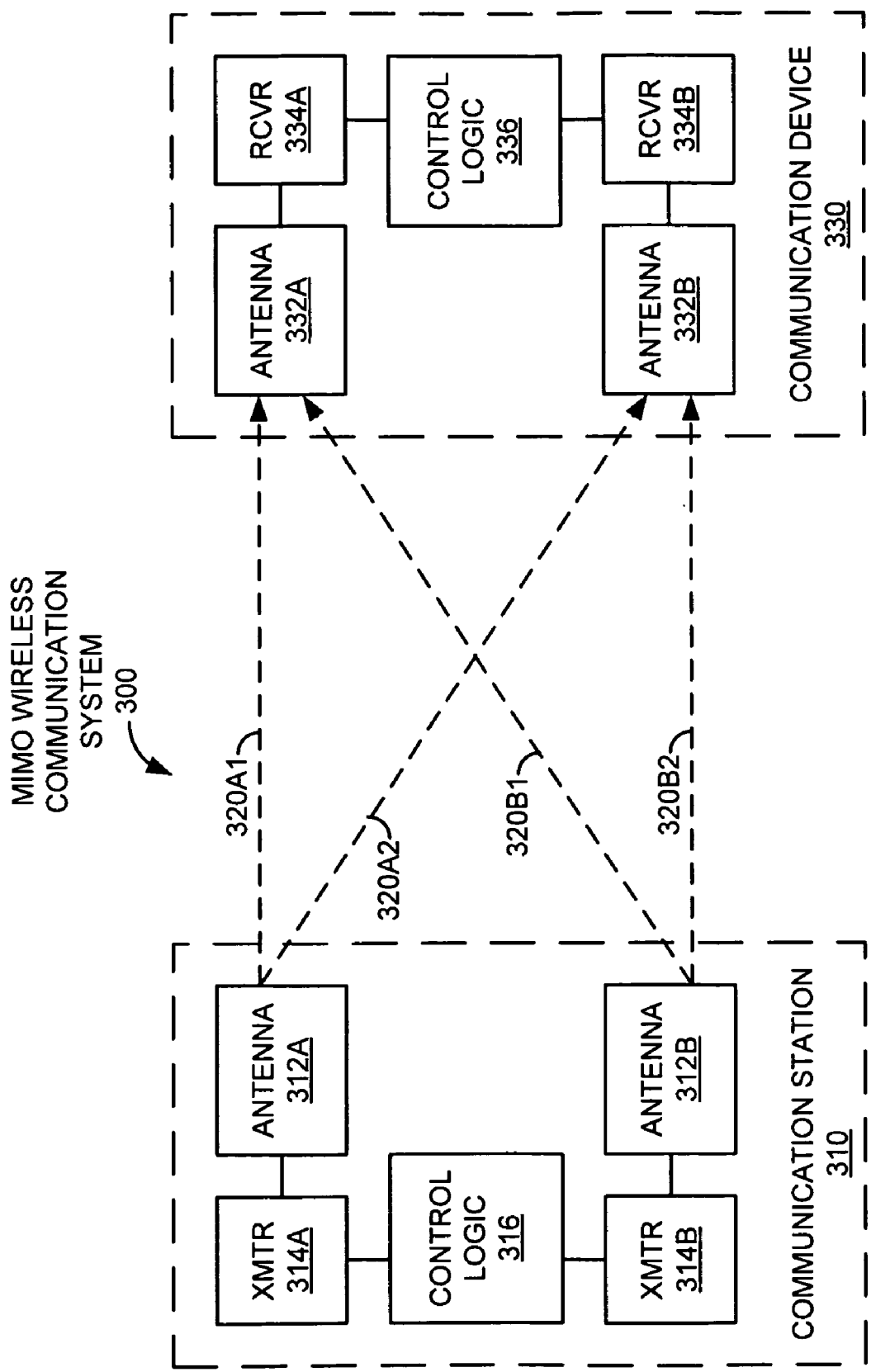
FIG. 3 is a block diagram of a wireless communication system according to another embodiment of the invention.

A portion of another wireless communication system 300, one employing a multiple-input, multiple-output (MIMO) antenna system, is depicted in the block diagram of FIG. 3. The communication system 300 includes a communication station 310 and a communication device 330. In one particular implementation, the wireless communication system 300 employs the Worldwide Interoperability for Microwave Access (WiMAX) technology based upon the Institute for Electrical and Electronics Engineers (IEEE) 802.16 standard. More specifically, in one embodiment, the communication station 310 may be a WiMAX base station (BS) 310, while the communication device 330 may be a WiMAX mobile station (MS) or subscriber station (SS), such as a cell phone, PDA, or other user-oriented communication device. However, various types of wireless, and possible wireline, communication standards other than WiMAX may also benefit from aspects of the implementation depicted in FIG. 3.

In FIG. 3, the communication station 310 and the communication device 330 each employ two antennas: a first antenna 312A and a second antenna 312B at the communication station 310, and a first antenna 332A and a second antenna 332B for the communication device 330. In other versions, numbers of antennas greater than two may be employed for each of the communication station 310 and the communication device 330. Also, the number of antennas employed at the communication station 310 need not equal the number of antennas utilized in the communication device 330 in other examples.

Each of the antennas 312A, 312B of the communication station 310 is driven by a transmitter 314A, 314B, respectively, for transmitting a corresponding communication signal 320A, 320B. Further, the transmitters 314 are coupled to control logic 316 configured to control the operation of the transmitters 314 according to at least two separate operating modes, as is described in greater detail below.

Similarly, each of the antennas 332A, 332B of the communication device 330 is coupled to a separate receiver 334A, 334B, respectively. Each of the receivers 334 is configured to receive the communication signals 320A, 320B from the communication station 310 that are received at its corresponding antenna 332. Also, control logic 336 is coupled with each of the receivers 334A, 334B to operate the receivers 334A, 334B according the two different operating modes noted above.

The control logic 316 of the communication station 310 and the control logic 336 of the communication station 330 may each include one or more processors, such as microprocessors, microcontrollers, or digital signal processors (DSPs), capable of performing the various control tasks described hereafter. In another example, the control logic 316 of the communication station 310 and the control logic 336 of the communication station 330 may include hardware components or devices, or a combination of hardware and software elements, for performing these same operations.

As shown in FIG. 3, the first antenna 332A of the communication device 330 receives a first version 320A1 of the first communication signal 320A transmitted by way of the first antenna 312A of the communication station 310, as well as a first version 320B1 of the second communication signal 320B transmitted by the second antenna 312B of the communication station 310. In a corresponding manner, the second antenna 332B of the communication device 330 receives a second version 320A2 of the first communication signal 320A transmitted by way of the first antenna 312A of the communication station 310 in addition to a second version 320B2 of the second communication signal 320B transmitted by the second antenna 312B of the communication station 310. The space and/or time diversity provided by the various versions 320A1, 320A2, 320B1, 320B2 of these signals 320A, 320B, created at least by the timing of the signals 320A, 320B as transmitted from the communication station 310, as well as the diverse locations of the several antennas 312A, 312B, 332A, 332B, allows the communication system 300 to operate in either of the at least two operating modes mentioned above.

Figure 4A:
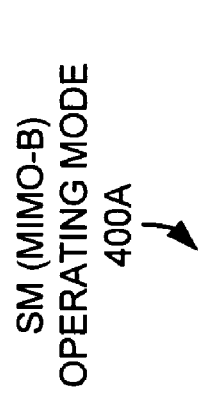
FIGS. 4A and 4B depict two possible communication operating modes for the wireless communication system of FIG. 3 according to an embodiment of the invention.
Figure 4B:

FIGS. 4A and 4B each provide a graphical representation of the data transferred in the communication signals 320A, 320B in a particular communication operating mode. In FIG.

4A, each of the communication signals 320A represent different data encapsulated in "symbols", as the term is employed in orthogonal frequency division multiplexing (OFMD) or orthogonal frequency division, multiple access (OFDMA) communication schemes of the WiMAX environment. More specifically, each binary digit ("bit") of each symbol may be carried by a separate subcarrier frequency of its corresponding signal 320. In some implementations, each of the symbols may include data for more than one communication device 330 in communication with the communication station 310. Further, the bits of the symbol that are associated with a particular communication device 330 may be encoded according to any of a number of modulation and coding schemes (MCSs), with each communication device 330 potentially employing a different MCS.

FIG. 4A presents a represents a first operating mode 400A through which data throughput is maximized. More specifically, each of the two communication signals 320A, 320B carries symbols that are not duplicated in the opposing communication signal 320A, 320B. In the specific implementation of FIG. 4A, the first communication signal 320A carries even-number symbols S0, S2, S4, and so on in a serial fashion, while the second communication signal 320B carries odd-numbered symbols S1, S3, S5, and so forth. In one implementation, the symbols of the two signals 320A, 320B are alternating symbols of the same data stream, such as a stream associated with a WiMAX downlink connection. As a result, in this first operating mode 400A, the communication station 310 transmits two different symbols during a single symbol period at the cost of a lack of redundancy in the transferred data, as each symbol is transmitted but once.

In comparison, FIG. 4B depicts a second operating mode 400B in which each of the communication signals 320A, 320B carries a representation of each symbol transmitted from the communication station 310 to the communication device 330. In this specific example, the first communication signal 320A carries each of the even-numbered symbols S0, S2, S4, and the like, while the second communication signal 320B incorporates the odd-numbered symbols S1, S3, S5, and so on. Further, between each of the even-numbered symbols, the first communication signal 320A carries a representation of each of the odd-numbered symbols: more specifically, the negative of the conjugate of each odd-number symbol, labeled −S1*, −S3*, −S5*, and so forth. Similarly, between each odd-numbered symbol in the second communication signal 320B is transmitted the conjugate of each even-numbered symbol, shown as S0*, S2*, S4*, and thereafter. Accordingly, the communication station 310 delivers only one unique symbol per symbol time period, but also provides a redundant copy of each symbol that varies in terms of representation (via the use of conjugates), time (as each conjugate is delayed one period from the original symbol), and space (since each conjugate is transferred from a different antenna 312 from that of the original symbol).

In some implementations, the operating mode 400B of FIG. 4B is labeled "space-time coding" (STC), or MIMO-A, while the operating mode 400A of FIG. 4A is often termed spatial multiplexing (SM), or MIMO-B. As seen above, the SM mode facilitates twice the data throughput of that associated with the STC mode. However, the SM mode is typically more sensitive to challenging geographic and atmospheric conditions than is the STC mode due to the lack of diversity, typically resulting in a higher data error rate in the symbols received at the communication device 330. Thus, some communication systems employing MIMO operational modes may switch between one mode (e.g., SM mode) and another mode (e.g., STC mode) based on a measure of the communication signal 320 quality at the receiving device 330. In one example, a high carrier-to-interference-plus-noise ratio (CINR) of the communication signals 320 at the receiving device 330 may indicate the use of the SM mode, while employment of the STC mode may be warranted at lower CINR values.

However, further influencing some wireless communication systems is multi-path fading, in which one or more reflections of the communication signals 320 due to geographic features, such as buildings, hills, and other objects, may create multiple, time-shifted, attenuated versions of the original communication signals 320. As a result, in many communication systems, multi-path fading is often considered an impediment to successful wireless communications. However, a lack of multi-path fading, such as when a strong line-of-sight (LOS) exists between the communication station 310 and the communication device 330, may negatively impact MIMO antenna systems operating in the SM mode, as the SM mode (i.e., MIMO-B) may operate more efficiently in the presence of a significant multi-path effect, which provides a type of signal diversity. In other words, even in environments in which a high CINR is experienced, the lack of a multi-path effect may result in high data error rates while operating in SM or MIMO-B mode.

Accordingly, implementations of the communication system 300 of FIG. 3 disclosed herein incorporate a measurement of the multi-path effect in determining which of multiple communication operating modes may be implemented at any particular time. For example, the multi-path effect may be quantified by way of a multi-path power metric, or "multi-path index", comparing the power of a dominant or highest-power signal path, such as that associated with a direct line-of-sight between the communication station 310 and the communication device 330, with the sum of the powers of the remaining, secondary signal paths. In this instance, the multi-path power metric may equal the sum of the powers of the secondary signal paths, divided by the power of the dominant (main) path signal:

$$\text{multi\_path\_index} = \frac{\left(\sum_{i=1}^{n} \text{scndary\_path\_power}_i\right)}{\text{main\_path\_power}}$$

While the remainder of the disclosure discusses the use of the multi-path index specified in the above equations, other mathematical expressions indicating a relationship between the main signal power and the powers of the secondary signal paths due to the multi-path effect may be employed in other embodiments. For example, the reciprocal of the above expression may be employed. In another instance, the main path power may be included in the sum of the secondary signal paths.

FIG. 5 provides a block diagram of circuitry 500 residing within a receiver equalizer, which may, in turn, be located in the control logic 336 of the communication device 330, or possibly distributed among the receivers 334A, 334B of the communication device 330. In general, a receiver equalizer estimates a delay and phase difference reflected in each of a number of paths of a multi-path signal to exploit the time diversity of the multi-path effect to recover the original communication signal in the event of fading of one or more of the signal paths. In the equalizer circuitry 500 of FIG. 5, the received communication signals 320 received at one or both of the antennas 332A, 332B are distributed to a reference signal generator 502 and multiple phase rotators 504A, 504B, ..., 504N. The reference signal generator 502 employs the incoming signals 320 to generate a different reference signal 503A, 503B, ..., 503N for each of the phase rotators 504A, 504B, ..., 504N. In one example, the reference signal generator 502 generates each of the reference signals 503 based on an estimate of the delay and/or phase difference associated with a particular signal path of the multi-path signals.

Each phase rotator 504A, 504B, ..., 504N rotates the phase of the received signal 302 at a rate indicated by its corresponding reference signal 503A, 503B, ..., 503N to generate a rotator output signal 505A, 505B, ..., 505N, which is then forwarded as input to an associated delay equalizer 506A, 506B, ..., 506N. Each delay equalizer 506A, 506B, ..., 506N equalizes or corrects the phase of its rotator output signal 505A, 505B, ..., 505N across a range of frequencies. This processing results in each delay equalizer 506A, 506B, ..., 506N generating a separate signal for each of a number of signal paths associated with the received communication signals 302. As shown in FIG. 5, the delay equalizer 506A generates a primary or main path signal 508A, while each of the remaining delay equalizers 506B-506N generates a corresponding secondary path signal 508B-508N. Thereafter, the power of each of these signals may be monitored continuously or periodically to generate the multi-path power metric, or multi-path index, as described above.

In one embodiment, the control logic 336 of the communication device 330 may also generate a numerical value indicative of the quality of the received communication signals 320. For example, the control logic 336 may periodically or continuously calculate a carrier-to-interference-plus-noise ratio (CINR) of the received communication signals 320. Other measures of signal quality, such as a symbol- or signal-to-interference-plus-noise ratio (SINR) of the received communication signals 320, may be utilized to similar effect in other implementations.

Presuming the use of the CINR as a signal quality measurement, the communication device 330 may then transfer both the CINR and the multi-path index to the communication station 310, such as by way of the antennas 312, 332 shown in FIG. 3 (along with transmitters of the communication device 330 and receivers of the communication station 310 not shown in FIG. 3), or by other wired or wireless means. Transmission of the two values may occur at some predetermined intervals, or when certain events occur, such as a predetermined level of data errors experienced at the communication device 330.

In turn, the control logic 316 of the communication station 310 may evaluate the received multi-path index and the CINR to determine whether a change in the current operating mode of the communication system 300 is warranted. In one example, the control logic 316 generates an operating mode decision metric based on the multi-path index and the CINR:

decision_metric=($k1$·CINR)+($k2$·multi_path_index)

In the equation for the mode decision metric shown above, k1 and k2 may be configuration parameters that are constants. In another example, the communication station 310 may adjust and/or optimize the configuration parameters based on current communication events (such as data errors), historical patterns regarding communication traffic at particular times of the day or week, prevailing environmental conditions, and other considerations.

Given the definition of the operating mode decision metric presented above, higher values of the decision metric tend to promote the use of the SM mode (MIMO-B). More specifically, a relatively high CINR, indicating low-noise, high-quality communication signals 320, generally facilitates the use of the SM (MIMO-B) mode to increase data throughput of the communication system 300. Similarly, a high multi-path index, indicating the presence of significant secondary signal paths in the communication signals 320, also supports the use of the SM mode. Conversely, a low CINR (i.e., the presence of significant noise or interference) and/or a low multi-path index (i.e., a strong line-of-sight signal without significant alternative paths) typically results in high data error rates at the communication device 330, thus informing the use of the lower-throughput, more reliable STC (MIMO-A) mode. Since conditions may occur in which a high CINR and a low multi-path index (or vice versa) exist simultaneously, the configuration parameters k1 and k2 may be adapted to serve as balancing or weighting factors for assigning a relative importance to the CINR and multi-path index values in determining the current operating mode.

In one embodiment, the antenna mode decision metric may be compared against a single predetermined threshold value. More specifically, if the decision metric is higher than such a threshold, SM (MIMO-B) may be the preferred operating mode, while a decision metric lower than the threshold may prompt the use of STC (MIMO-A). Further, as described later, the threshold may itself be modified based upon one or more events, such as high average or burst data error rates.

In another example, the operating mode decision metric may be employed to select both an antenna operating mode (such as MIMO-A versus MIMO-B) and a modulation and coding scheme (MCS) operating mode. In the WiMAX environment, for example, a number of MCS modes, including several types of each of quadrature phase shift keying (QPSK) and quadrature amplitude modulation (QAM), may be employed. Further, one or more of the schemes may be transmitted in either MIMO-A or MIMO-B mode. A particular implementation of the use of the decision metric in this environment is disclosed in the table 600 presented in FIG. 6. Each row of the table 600 identifies a possible MCS mode 602, along with an associated antenna operating mode 604. Noted with each MCS mode 602/MIMO mode 604 pair is the resulting number of bits per symbol 606. As shown in the table 600, the MCS 602/MIMO 604 pairs are listed from top to bottom in order of increasing data throughput. Further, each of the 64 QAM schemes is shown to be implemented with either the SM mode or STC mode, while the remaining QAM and QPSK schemes are employed with the STC antenna operating mode only.

Additionally, each MCS 602/MIMO 604 pair is assigned a particular threshold range 608 for the operating mode decision metric discussed above, with higher threshold ranges 608 being associated with higher-throughput MCSs, and possibly the SM (MIMO-B) antenna mode. For example, if the operating mode decision metric, as computed by the communication station 310 falls within threshold range 11, the communication station 310 will format the communication signals 320 according to the 64 QAM ½ scheme using the SM (MIMO-B) antenna operating mode.

Further, as indicated earlier, if the use of one or more of the MCS 602/MIMO 604 pairs result in poor communication performance, such as an unacceptably high average or burst data error rate, one or more of the threshold ranges 608 may be raised so that the higher-throughput MCS 602/MIMO 604 pairs are employed under more favorable conditions. Oppositely, one or more of the threshold ranges 608 may be lowered if the control logic 316 of the communication station 310 determines that a more aggressive use of the higher-throughput modes will not result in worse overall communication performance.

In one arrangement, each time the communication station 310 determines that a change in the current MCS and/or MIMO operating mode is warranted, the communication device 310 notifies the communication device 330 involved of the change, as well as possibly the timing of the change, so that each mode change is tightly coordinated within the affected portions of the wireless communication system 300. The notification may occur by way of the communication signals 320 or another communication path.

While a relatively few embodiments have been explicitly disclosed herein, many other implementations are also possible while remaining with the scope of the invention. For example, while the use of a threshold for a single decision metric incorporating both the CINR and the multi-path index has been discussed, another embodiment may employ a separate threshold for each of the CINR and the multi-path index. As a result, in one implementation, the control logic 316 of the communication station 310 may employ SM (MIMO-B) mode only if the CINR attains the level of a first threshold and the multi-path index surpasses a second threshold.

Also, while the multi-path index is employed in conjunction with the CINR in determining the current mode in the above implementations, the multi-path index may be employed by itself or in connection with other communication signal performance measurements, such as a data error rate, in other communication system arrangements.

Also above, the communication device 330 generates both the CINR and the multi-path index, and then transfers these values to the communication station 330 for processing and the ultimate determination of the next operating mode. In other examples, however, either of the communication device 330 and the communication station 310 may perform any of the calculation, processing and determination operations discussed herein.

Many other options regarding the utilization of multiple communication operating modes are also possible. For instance, while the operating modes have been discussed almost exclusively in conjunction with a single communication device 330, many other communication devices 330 may exchange data with the communication station 310 concurrently. Thus, the communication between the station 310 and each communication device 330 may be operated under a different antenna and/or modulation and coding scheme mode. Further, a geographic service area surrounding the communication station 310 may be subdivided into multiple sectors, each of which the station 310 services by way of a separate antenna pair 312 and transmitter pair 314. In that case, the communication station 310 may implement a distinct MIMO/MCS pair for each sector serviced.

Furthermore, while the above implementations discuss the presence of communications from the communication station 310 to the communication device 330, the communication device 330 may also transmit communication signals to the communication station 310, resulting in two-way, or duplex, communications therebetween. In the specific case of WiMAX, this two-way communication is implemented by way of a time-division-duplex (TDD) scheme in which alternating uplink (i.e., to the communication station 310) and downlink (i.e., from the communication station 330) subframes are employed to transfer communication signals in either direction. In this or other duplex communication environments, the current antenna mode and/or MCS mode may apply to either or both of the communication directions.

Various embodiments as described above facilitate effective communication operating mode selection based upon a measurement of the multi-path effects on a communication signal, which often influences the reliability and maximum data throughput of the signal. A metric quantifying the multi-path effect may also be combined with other communication performance factors, such as CINR and data error rates, to further refine the decision making process. Further, the methods described above may aid in selecting from both antenna modes of operation, such as MIMO-A and MIMO-B, as well as other modes of operation, such as modulation and coding schemes applicable to the communication signals being transmitted. Additionally, communication systems involving only a single transmitting antenna and a single receiving antenna that employ multiple MCS modes may utilize the multi-path power metric to select between the available MCS modes in the absence of multiple antenna operating modes.

The above description and associated figures teach the best mode of the invention. The following claims specify the scope of the invention. Note that some aspects of the best mode may not fall within the scope of the invention as specified by the claims. Also, while many of the embodiments described above specifically involve use of the WiMAX communication environment, other wired and wireless communication system employing other communication schemes may employ the concepts discussed herein to similar benefit. Those skilled in the art will also appreciate that the features described above can be combined in various ways to form multiple variations of the invention. As a result, the invention is not limited to the specific embodiments described above, but only by the following claims and their equivalents.

What is claimed is:

1. A method for communication operating mode selection, the method comprising:
    transmitting each of a plurality of communication signals by way of a separate one of a first plurality of antennas according to a first operating mode;
    receiving the transmitted communication signals by way of a second plurality of antennas;
    generating a multi-path power metric of the received communication signals; and
    transmitting each of the plurality of communication signals by way of the first plurality of antennas according to a second operating mode instead of the first operating mode based on the multi-path power metric.

2. The method of claim 1, wherein the multi-path power metric comprises a sum of a power of each of a plurality of secondary signal paths of the received communication signals divided by a power of a dominant signal path of the received communication signals.

3. The method of claim 1, wherein the first plurality of antennas and the second plurality of antennas are operated as a multiple-input, multiple-output antenna system.

4. The method of claim 3, wherein the first plurality of antennas comprises a first transmitting antenna and a second transmitting antenna, and the second plurality of antennas comprises a first receiving antenna and a second receiving antenna.

5. The method of claim 4, wherein one of the first operating mode and the second operating mode comprises transmitting the communication signal of the first transmitting antenna as a first data stream and transmitting the communication signal of the second transmitting antenna as a second data stream, wherein the first data stream and the second data stream comprise different data.

6. The method of claim 4, wherein one of the first operating mode and the second operating mode comprises transmitting the communication signal of the first transmitting antenna as a first portion of a data stream and a time-diverse version of a second portion of the data stream, and transmitting the communication signal of the second transmitting antenna as the second portion of the data stream and a time-diverse version of the first portion of the data stream.

7. The method of claim 4, wherein one of the first operating mode and the second operating mode comprises transmitting the communication signal of the first transmitting antenna and the communication signal of the second transmitting antenna according to a modulation and coding scheme.

8. The method of claim 1, further comprising:
generating a carrier-to-interference-plus-noise ratio of the received communication signals;
wherein transmitting each of the plurality of communication signals according to the second operating mode is based on a value comprising the multi-path power metric and the carrier-to-interference-plus-noise ratio.

9. The method of claim 8, wherein the value comprises a sum of the carrier-to-interference-plus-noise ratio multiplied by a first configuration parameter and the multi-path power metric multiplied by a second configuration parameter.

10. The method of claim 8, wherein transmitting each of the plurality of communication signals according to the second operating mode comprises:
comparing the value to a threshold;
wherein transmitting each of the plurality of communications according to the second operating mode occurs when the value exceeds the threshold; and
wherein the first operating mode comprises a spatial multiplexing mode and the second operating mode comprises a space-time coding mode.

11. The method of claim 10, further comprising:
transmitting each of the plurality of communication signals according to the first operating mode instead of the second operating mode when the value falls below the threshold.

12. The method of claim 10, further comprising:
modifying the threshold based on an error rate of the received communication signals.

13. A communication station, comprising:
a plurality of antennas;
a plurality of transmitters, wherein each of the transmitters is configured to generate a communication signal for a corresponding one of the antennas and transmit the communication signal to a communication device by way of the corresponding one of the antennas; and
control logic configured to operate the transmitters in a first operating mode when transmitting the communication signals, receive a multi-path power metric of the communication signals as received at the communication device, and operate the transmitters in a second operating mode instead of the first operating mode based on the multi-path power metric when transmitting the communication signals.

14. The communication station of claim 13, wherein:
each of the transmitters is configured to generate a second communication signal for the corresponding one of the antennas and transmit the second communication signal to a second communication device by way of the corresponding one of the antennas;
the control logic is configured to operate the transmitters in the first operating mode when transmitting the second communication signals, receive a second multi-path power metric of the second communication signals as received at the second communication device, and operate the transmitters in the second operating mode instead of the first operating mode based on the second multi-path power metric when transmitting the second communication signals; and the operating mode of the transmitters when transmitting the first communication signals is independent of the operating mode of the transmitters when transmitting the second communication signals.

15. The communication station of claim 13, further comprising:
a plurality of second antennas; and
a plurality of second transmitters, wherein each of the second transmitters is configured to generate a communication signal for a corresponding one of the second antennas and transmit the communication signal to a second communication device by way of the corresponding one of the second antennas;
wherein the control logic is configured to operate the second transmitters in the first operating mode, receive a second multi-path power metric of the communication signals as received at the second communication device, and operate the second transmitters in the second operating mode instead of the first operating mode based on the second multi-path power metric; and
wherein the operating mode of the first transmitters is independent of the operating mode of the second transmitters.

16. The communication station of claim 13, further comprising:
at least one receiver coupled to at least one of the antennas;
wherein the control logic is configured to receive the multi-path power metric from the communication device by way of the at least one receiver through the at least one of the antennas.

17. The communication station of claim 16, wherein:
the control logic is configured to receive a carrier-to-interference-plus-noise ratio from the communication device by way of the at least one receiver through the at least one of the antennas, and operate the transmitters in the second operating mode instead of the first operating mode when transmitting the communication signals based on the multi-path power metric and the carrier-to-interference-plus-noise ratio.

18. The communication station of claim 13, wherein:
one of the first operating mode and the second operating mode comprises a spatial multiplexing mode; and
the other of the first operating mode and the second operating mode comprises a space-time coding mode.

19. A communication device, comprising:
a plurality of antennas;
a plurality of receivers, wherein each of the receivers is configured to receive a communication signal from a communication station by way of a corresponding one of the antennas; and
control logic configured to receive the communication signals from the plurality of receivers, generate a multi-path power metric based on the received communication signals, and transmit the multi-path power metric to the communication station for determining an operating mode of the receivers.

20. The communication device of claim 19, wherein:
the control logic comprises an equalization circuit configured to generate the multi-path power metric, wherein the multi-path power metric comprises a sum of a power of each of a plurality of secondary signal paths of the received communication signals divided by a power of a dominant signal path of the received communication signals.

* * * * *